(12) United States Patent
Kailash et al.

(10) Patent No.: US 9,912,638 B2
(45) Date of Patent: *Mar. 6, 2018

(54) SYSTEMS AND METHODS FOR INTEGRATING CLOUD SERVICES WITH INFORMATION MANAGEMENT SYSTEMS

(71) Applicants: Kailash Kailash, San Jose, CA (US); Chakkaravarthy Periyasamy Balaiah, Bangalore (IN); Sushil Pangeni, Bangalore (IN); Amit Sinha, San Jose, CA (US); Samuel John Crank, Canton, GA (US); Manoj Apte, San Jose, CA (US); Sridhar Narasimhan, Bangalore (IN)

(72) Inventors: Kailash Kailash, San Jose, CA (US); Chakkaravarthy Periyasamy Balaiah, Bangalore (IN); Sushil Pangeni, Bangalore (IN); Amit Sinha, San Jose, CA (US); Samuel John Crank, Canton, GA (US); Manoj Apte, San Jose, CA (US); Sridhar Narasimhan, Bangalore (IN)

(73) Assignee: Zscaler, Inc., San Jose, CA (US)

(*) Notice: Subject to any disclaimer, the term of this patent is extended or adjusted under 35 U.S.C. 154(b) by 304 days.

This patent is subject to a terminal disclaimer.

(21) Appl. No.: 14/597,623

(22) Filed: Jan. 15, 2015

(65) Prior Publication Data
US 2015/0163199 A1    Jun. 11, 2015

Related U.S. Application Data

(63) Continuation-in-part of application No. 13/459,475, filed on Apr. 30, 2012, now Pat. No. 8,955,091.

(51) Int. Cl.
| | | |
|---|---|---|
| *G06F 9/00* | (2006.01) | |
| *G06F 15/16* | (2006.01) | |
| *G06F 17/00* | (2006.01) | |
| *H04L 29/06* | (2006.01) | |
| *H04L 12/26* | (2006.01) | |
| *H04L 12/24* | (2006.01) | |
| *H04L 29/12* | (2006.01) | |

(52) U.S. Cl.
CPC ...... *H04L 63/0209* (2013.01); *H04L 63/1425* (2013.01); *H04L 41/0213* (2013.01);
(Continued)

(58) Field of Classification Search
CPC ............... H04L 63/1425; H04L 63/302; H04L 63/1416; H04L 63/1433; H04L 63/308;
(Continued)

(56) References Cited

U.S. PATENT DOCUMENTS 7,894,350 B2    2/2011    Kailash et al.
7,899,849 B2    3/2011    Chaudhry et al.
(Continued)

*Primary Examiner* — Fatoumata Traore
*Assistant Examiner* — Amie C Lin
(74) *Attorney, Agent, or Firm* — Clements Bernard Walker PLLC; Lawrence A. Baratta, Jr.

(57) ABSTRACT

Systems and methods of integrating log data from a cloud system with an internal management system are described, wherein the cloud system is located externally from a secure network which contains the internal management system. The systems and methods include receiving log data from a cloud system through a secure connection between the secure network and the cloud system; buffering the received log data; filtering the buffered, received log data; and transmitting the filtered, buffered, received log data to the internal management system in a format associated with the internal management system.

18 Claims, 8 Drawing Sheets

(52) U.S. Cl.
CPC ........ *H04L 41/069* (2013.01); *H04L 41/5096* (2013.01); *H04L 43/0817* (2013.01); *H04L 61/2514* (2013.01); *H04L 63/1416* (2013.01); *H04L 63/1433* (2013.01)

(58) Field of Classification Search
CPC ... H04L 63/0209; H04L 41/02; H04L 41/069; H04L 41/0213; H04L 41/5096; H04L 43/06
See application file for complete search history.

(56) References Cited

U.S. PATENT DOCUMENTS

| | | |
|---|---|---|
| 7,921,089 B2 | 4/2011 | Kailash et al. |
| 8,539,589 B2 | 9/2013 | Prafullchandra et al. |
| 2008/0307525 A1* | 12/2008 | Nickle ............... G06Q 10/06 726/22 |
| 2009/0177514 A1 | 7/2009 | Hudis et al. |
| 2010/0088150 A1 | 4/2010 | Mazhar et al. |
| 2010/0125903 A1 | 5/2010 | Devarajan et al. |
| 2010/0212010 A1 | 8/2010 | Stringer et al. |
| 2011/0167474 A1 | 7/2011 | Sinha et al. |
| 2011/0202544 A1 | 8/2011 | Carle et al. |
| 2011/0219434 A1 | 9/2011 | Betz et al. |
| 2011/0225647 A1 | 9/2011 | Dilley et al. |
| 2011/0295727 A1* | 12/2011 | Ferris ................. G06F 11/34 705/34 |
| 2012/0151273 A1 | 6/2012 | Ben Or et al. |
| 2012/0311611 A1 | 12/2012 | Wang et al. |
| 2013/0117847 A1* | 5/2013 | Friedman ............ H04L 63/1425 726/22 |
| 2013/0343281 A1* | 12/2013 | Bakker ............... H04W 36/023 370/328 |

* cited by examiner

SYSTEMS AND METHODS FOR INTEGRATING CLOUD SERVICES WITH INFORMATION MANAGEMENT SYSTEMS

CROSS-REFERENCE TO RELATED APPLICATION(S)

This patent application/patent is a continuation-in-part of co-pending U.S. patent application Ser. No. 13/459,475 filed Apr. 30, 2012, and entitled "SYSTEMS AND METHODS FOR INTEGRATING CLOUD SERVICES WITH INFORMATION MANAGEMENT SYSTEMS," the contents of which are incorporated in full by reference herein.

FIELD OF THE INVENTION

Generally, the field of art of the present disclosure pertains to computer and network systems and methods, and more particularly, to systems and methods for integrating cloud services with Information Management Systems such as Security Information and Event Management (SIEM) systems and methods.

BACKGROUND OF THE INVENTION

Enterprises with computer networks have a need to monitor network usage for a variety of reasons including policy compliance, reporting, threat detection, determining efficiencies, and the like. Security Information and Event Management (SIEM) systems and methods refer to a combination of the formerly disparate product categories of SIM (security information management) and SEM (security event management). Conventional SIEM systems and methods provide real-time analysis of security alerts generated by network hardware and applications. SIEM solutions come as software, appliances, or managed services, and are also used to log security data and generate reports for compliance purposes. The acronyms SEM, SIM and SIEM have been used interchangeably, though there are differences in meaning and product capabilities. The segment of security management that deals with real-time monitoring, correlation of events, notifications and console views is commonly known as Security Event Management (SEM). The second area provides long-term storage, analysis and reporting of log data and is known as Security Information Management (SIM). The term Security Information Event Management (SIEM) describes the product capabilities of gathering, analyzing and presenting information from network and security devices; identity and access management applications; vulnerability management and policy compliance tools; operating system, database and application logs; and external threat data. A key focus is to monitor and help manage user and service privileges, directory services and other system configuration changes; as well as providing log auditing and review and incident response.

An important aspect of conventional SIEM systems and methods is they are located within an enterprise's network, e.g. behind a firewall or the like. With the emergence of the cloud, there is a need to provide functionality of conventional SIEM systems and methods with cloud-based services.

BRIEF SUMMARY OF THE INVENTION

In an exemplary embodiment, a method of integrating log data from a cloud system with an internal management system is described, wherein the cloud system is located externally from a secure network which contains the internal management system. The method includes receiving log data from a cloud system through a secure connection between the secure network and the cloud system; buffering the received log data; filtering the buffered, received log data; and transmitting the filter, buffered, received log data to the internal management system in a format associated with the internal management system. The transmitting of the filtered, buffered, received log data to the internal management system is via simple, insecure protocols inside the secure network. The internal management system can be a Security Information and Event Management (SIEM) system, and the method is performed via an external service bridge which is located within the secure network. The external service bridge can be any of a server, an appliance, a service operating on a virtual machine, and a service operating on a hardware device inside the secure network. The log data can undergo a first line of filtering in the cloud system and a second line of filtering within the secure network, prior to being sent to the internal management system. The cloud system can be configured to proactively detect and preclude distribution of security threats between users associated with the secure network and the Internet, and wherein the security threats comprise any of malware, spyware, viruses, trojans, botnets, email spam, data leakage, policy violations, and other undesirable content. The format can be American Standard Code for Information Interchange (ASCII) format and the transmitting is over a Transmission Control Protocol (TCP) connection inside the secure network. The internal management system can be configured to perform any of data aggregation, correlation, alerting, dashboard, compliance, and retention of data. The internal management system can be a first internal management system of a plurality of internal management systems, and the method can further include transmitting the filtered, buffered, received log data accordingly to each of the plurality of internal management systems in an associated format. A record of the filtered, buffered, received log data can be sent to at least two of the plurality of internal management systems.

In another exemplary embodiment, a system configured to integrate log data from a cloud system with an internal management system is described, wherein the cloud system is located externally from a secure network which contains the internal management system. The system includes a network interface communicatively coupled to the secure network and the cloud system; a processor communicatively coupled to the network interface and a data store; and memory storing instructions that, when executed, cause the processor to obtain log data from the cloud system through a secure connection, via the network interface, between the secure network and the cloud system; buffer the received log data in the data store; filter the buffered, received log data; and cause transmission of the filtered, buffered, received log data to the internal management system, via the network interface, in a format associated with the internal management system. The filtered, buffered, received log data is transmitted to the internal management system via simple, insecure protocols inside the secure network. The internal management system can be a Security Information and Event Management (SIEM) system, and the system can be an external service bridge which is located within the secure network. The external service bridge can be any of a server, an appliance, a service operating on a virtual machine, and a service operating on a hardware device inside the secure network. The log data can undergo a first line of filtering in the cloud system and a second line of filtering within the secure network, prior to being sent to the internal management system. The cloud system can be configured to proactively detect and preclude distribution of security threats between users associated with the secure network and the Internet, and wherein the security threats comprise any of malware, spyware, viruses, trojans, botnets, email spam, data leakage, policy violations, and other undesirable content. The format can be American Standard Code for Information Interchange (ASCII) format and the network interface can be configured to transmit over a Transmission Control Protocol (TCP) connection inside the secure network to the internal management system. The internal management system can be configured to perform any of data aggregation, correlation, alerting, dashboard, compliance, and retention of data. The internal management system can be a first internal management system of a plurality of internal management systems, and the instructions, when executed, can further cause the processor to: cause transmission of the filtered, buffered, received log data accordingly to each of the plurality of internal management systems in an associated format. A record of the filtered, buffered, received log data can be sent to at least two of the plurality of internal management systems.

In an exemplary embodiment, a system includes an enterprise network including an internal management system communicatively coupled thereon, the enterprise network includes security and the internal management system is disposed behind the security; a cloud system external to the enterprise network and communicatively coupled to the enterprise network, at least one user associated with the enterprise network is configured to communicate through the cloud system for cloud-based services, and the cloud system is configured to log data associated with the at least one user for the cloud-based services; and an external service bridge located in the enterprise network behind the security, the external service bridge is configured to securely communicate with the cloud system to receive the log data and to communicate with the internal management system to provide the log data thereto.

In another exemplary embodiment, a method includes logging transactions and events associated with users of an enterprise network in a management system on the enterprise network; communicating with a cloud system through a secure connection outside the enterprise network, wherein the cloud system is external to the enterprise network and at least one user uses cloud-based services through the cloud system; receiving log data through the secure connection from the cloud system for the at least one user, wherein the log data includes transactions and events associated with the at least one user and associated usage of the cloud-based services; and integrating the log data in the management system.

In yet another exemplary embodiment, an external service bridge includes a network interface communicatively coupled on a secure network; a processor; and memory storing computer executable instructions, and in response to execution by the processor, the computer executable instructions cause the processing node to perform steps of: establish a secure connection to an external network through the secure network; receive data from the secure connection; parse the data into one or more feeds; filter and format the data in the one or more feeds; and output the one or more feeds on the secure network to an internal management system, wherein the format includes a format expected by the internal management system.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, systems and methods for integrating cloud services with Information Management Systems such as Security Information and Event Management (SIEM) systems and methods are described. Generally, the systems and methods include an external service, an internal management system, and an external service bridge. The external service can include an external, cloud-delivered security, and/or networking service that generates events, alerts, logs. The internal management system can be a conventional SIEM system or the like, and the external service bridge is a system, appliance, etc. residing within the enterprise, e.g. behind the firewall, that interfaces with the external service and the internal management system for communication therebetween. As information technology (IT) services move to the cloud (i.e., outside the enterprise), the systems and methods described herein enable the cloud-based services to integrate with conventional internal management systems within the enterprise such as SIEMs that are typically behind an enterprise firewall.

Figure 1:
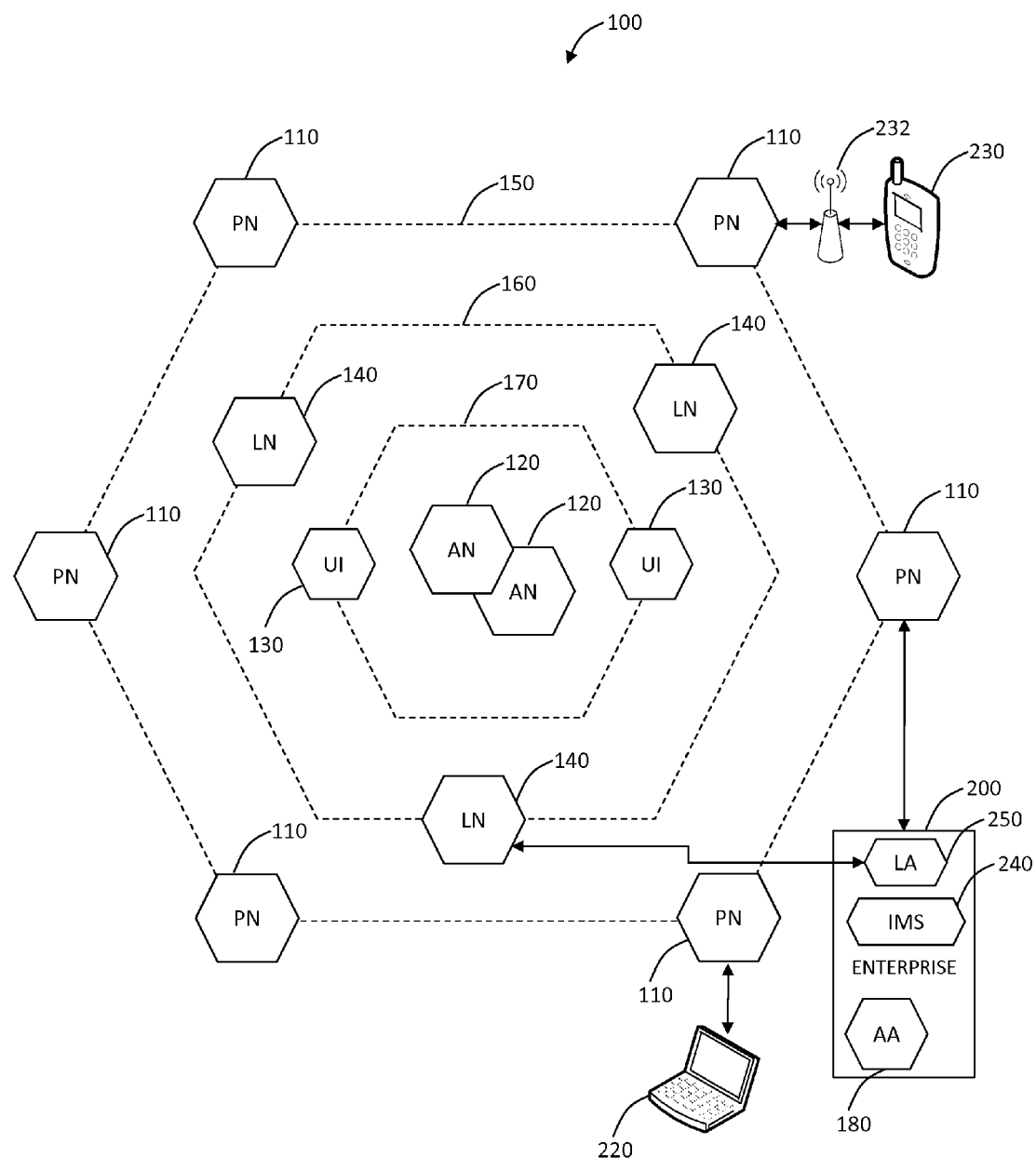
FIG. 1 is a network diagram of a distributed security system that is a cloud system and which can implement archiving systems and methods.

Referring to FIG. 1, in an exemplary embodiment, a block diagram illustrates a distributed security system 100. The system 100 can, for example, be implemented as an overlay network in a wide area network (WAN), such as the Internet, a local area network (LAN), or the like. The system 100 includes content processing nodes, processing nodes 110, that proactively detect and preclude the distribution of security threats, e.g., malware, spyware, viruses, trojans, botnets, email spam, data leakage, policy violations, etc., and other undesirable content sent from or requested by an external system. Example external systems can include an enterprise 200, a computer device 220, and a mobile device 230, or any other network and computing systems communicatively coupled to the system 100. In an exemplary embodiment, each of the processing nodes 110 cam include a decision system and method, e.g., data inspection engines that operate on a content item, e.g., a web page, a file, an email message, or some other data or data communication that is sent from or requested by one of the external systems.

In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 can generate a decision vector D=[d1, d2, . . . , dn] for a content item of one or more parts C=[c1, c2, . . . , cm]. Each decision vector can identify a threat classification, e.g., clean, spyware, malware, undesirable content, innocuous, spam email, unknown, data leakage, policy violation, etc. For example, the output of each element of the decision vector D can be based on the output of one or more data inspection engines. In an exemplary embodiment, the threat classification can be reduced to a subset of categories, e.g., violating, non-violating, neutral, unknown. Based on the subset classification, the processing node 110 can allow distribution of the content item, preclude distribution of the content item, allow distribution of the content item after a cleaning process, or perform threat detection on the content item. In an exemplary embodiment, the actions taken by one of the processing nodes 110 can be determined based on the threat classification of the content item and on a security policy of the external system to which the content item is being sent from or from which the content item is being requested by. A content item is violating if, for any part C=[c1, c2, . . . , cm] of the content item, at any of the processing nodes 110, any one of the data inspection engines generates an output that results in a classification of "violating."

Figure 3:
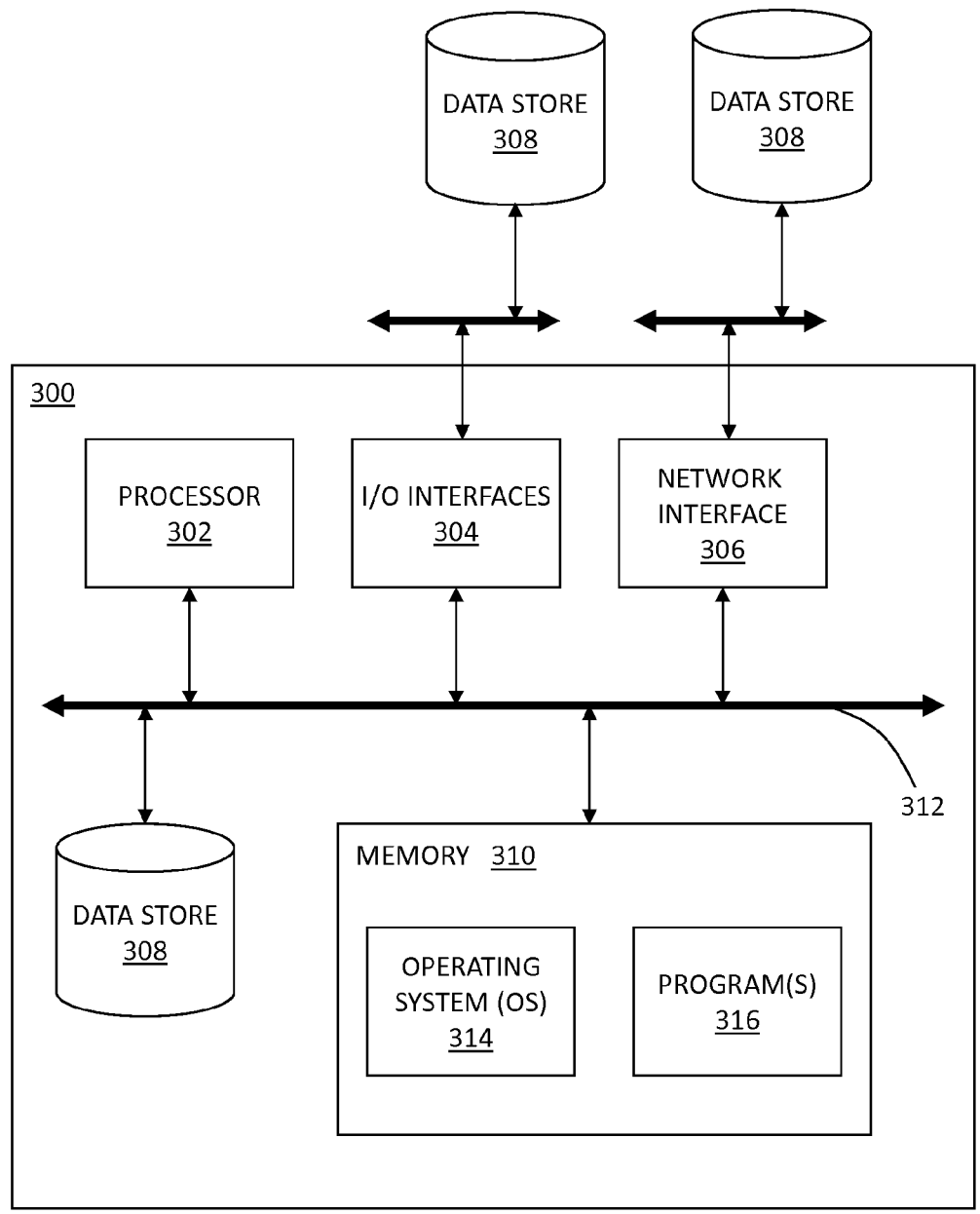
FIG. 3 is a block diagram of a server which may be used in the distributed security system of FIG. 1 or with any other cloud-based system.

Each of the processing nodes 110 can be implemented by one or more of computer and communication devices, e.g., server computers, gateways, switches, etc., such as the server 300 described in FIG. 3. In an exemplary embodiment, the processing nodes 110 can serve as an access layer 150. The access layer 150 can, for example, provide external system access to the security system 100. In an exemplary embodiment, each of the processing nodes 110 can include Internet gateways and one or more servers, and the processing nodes 110 can be distributed through a geographic region, e.g., throughout a country, region, campus, etc. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 can have multiple routers, switches, etc. that are used to communicate over the Internet, and the routers, switches, etc. can be configured to establish communications through the nearest (in traffic communication time or geographically, for example) processing node 110. A mobile device 230 can be configured to communicate with a nearest processing node 110 through any available wireless access device, such as an access point, high-speed wireless access, or a cellular gateway. A single computer device 220, such as a user's personal computer, can have its browser and email program configured to access the nearest processing node 110, which, in turn, serves as a proxy for the computer device 220. Alternatively, an Internet provider can have all of its customer traffic processed through the processing nodes 110.

In an exemplary embodiment, the processing nodes 110 can communicate with one or more authority nodes (AN) 120. The authority nodes 120 can store policy data for each external system as well as global security data, and can distribute the policy data to each of the processing nodes 110. The policy can, for example, define security policies for a protected system, e.g., security policies for the enterprise 200. Example policy data may define access privileges for users, web sites and/or content that is disallowed, restricted domains, acceptable use, data leakage prevention, etc. The authority nodes 120 can distribute the policy data to the processing nodes 110. In an exemplary embodiment, the authority nodes 120 can also distribute threat data that includes the classifications of content items according to threat classifications, e.g., a list of known viruses, a list of known malware sites, spam email domains, a list of known phishing sites, list of data leakage prevention terms, etc. The distribution of threat data between the processing nodes 110 and the authority nodes 120 can implemented by push and pull distribution schemes described in more detail below. In an exemplary embodiment, each of the authority nodes 120 can be implemented by one or more computer and communication devices, e.g., server computers, gateways, switches, etc., such as the server 300 described in FIG. 3. In some exemplary embodiments, the authority nodes 120, the logging nodes 140, and user interface (UI) front-ends 130 can serve as an application layer 160. The application layer 160 can, for example, manage and provide policy data, threat data, and data inspection engines and dictionaries for the processing nodes 110.

Other application layer functions can also be provided in an application layer 170, such as the user interface (UI) front-end 130. The user interface front-end 130 can provide a user interface through which users of the external systems can provide and define security policies, e.g., whether email traffic is to be monitored, whether certain web sites are to be precluded, etc. Another application capability that can be provided through the user interface front-end 130 is security analysis and log reporting. The underlying data on which the security analysis and log reporting functions operate are stored in logging nodes (LN) 140, which serve as a data logging layer, i.e. the application layer 160 can be referred to as the data logging layer. Each of the logging nodes 140 can store data related to security operations and network traffic processed by the processing nodes 110 for each external system. In an exemplary embodiment, the logging node 140 data can be anonymized so that data identifying an enterprise is removed or obfuscated. For example, identifying data can be removed to provide an overall system summary of security processing for all enterprises and users without revealing the identity of any one account. Alternatively, identifying data can be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data can be further encrypted, e.g., so that only the enterprise (or user if a single user account) can have access to the logging node 140 data for its account. Other processes of anonymizing, obfuscating, or securing logging node 140 data may also be used.

In an exemplary embodiment, an access agent 180 can be included in the external systems. For example, the access agent 180 is deployed in the enterprise 200. The access agent 180 can, for example, facilitate security processing by providing a hash index of files on a client device to one of the processing nodes 110, or can facilitate authentication functions with one of the processing nodes 110, e.g., by assigning tokens for passwords and sending only the tokens to a processing node so that transmission of passwords beyond the network edge of the enterprise is minimized. Other functions and processes can also be facilitated by the access agent 180. In an exemplary embodiment, the processing node 110 can act as a forward proxy that receives user requests to external servers addressed directly to the processing node 110. In another exemplary embodiment, the processing node 110 can access user requests that are passed through the processing node 110 in a transparent mode. A protected system, e.g., enterprise 200, can, for example, choose one or both of these modes. For example, a browser can be configured either manually or through the access agent 180 to access the processing node 110 in a forward proxy mode. In the forward proxy mode, all accesses are addressed to the processing node 110.

In an exemplary embodiment, an enterprise gateway can be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols can be used. In another exemplary embodiment, the processing nodes can may be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, at the within the enterprise the access agent 180 can be configured to perform MPLS labeling. In another transparent proxy mode exemplary embodiment, a protected system, such as the enterprise 200, can identify the processing node 110 as a next hop router for communication with the external servers.

Generally, the distributed security system 100 is an exemplary cloud based system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud based system, and those of ordinary skill in the art will recognize the archiving systems and methods contemplate operation on or with any cloud based system.

Operationally, the system 100 can provide policy-based, secure Internet access for any device, anywhere. The system 100 can be viewed as a cloud based security system. Traditionally, security was delivered as software which was installed on servers. Installation and deployment required time and expertise, prompting the migration to appliances. While the hardware simply plugs into existing infrastructures, multiple appliances must be installed at each gateway and an assortment of point products must be used to provide comprehensive security. Managing multiple user interfaces, policy managers, and log files is expensive, inefficient, and incomplete. In contrast, the system 100 provides SaaS, or cloud-delivered, security services. By analogy, rather than cleaning one's own water, one prefers water delivered through a tap on-demand; rather than generating one's own power, one prefers power delivered through power lines on-demand. In the same way, appliances are giving way to security as a service such as through the system 100 or the like.

Using the system 100, IT administrators or the like define policies and simply forward corporate Internet traffic to the system 100. The system 100 allows or blocks the traffic and can be used for all users, including the enterprise 200, the computer device 220, and the mobile device 230. The enterprise 200 can include an organization's home and regional offices, the computer device 220 and the mobile device 230 can include road warriors, mobile phone users, home-based employees, etc. Specifically, users such as the enterprise 200, the computer device 220, and the mobile device 230 are all accessing external systems, e.g. the Internet, by way of the system 100, i.e. through one of the processing nodes 110. As such, security for the users 220, 230 is pervasive and always present. There is no capital expenditure as investments are not required for either hardware or software at the users 220, 230. SaaS and the system 100 frees precious IT resources from performing operational security chores of managing and patching boxes, and updating data feeds and signatures. It enables IT to focus on strategic security such as policy and architecture.

The enterprise 200 can include an internal management system 240 within the enterprise's network. In an exemplary embodiment, the internal management system 240 can include a conventional SIEM system. With respect to the enterprise 200 and users associated therewith, the system 240 is configured to perform numerous functions including data aggregation, correlation, alerting, dashboard, compliance, retention, and the like. For example, the system 240 can aggregate data from many sources, including network, security, servers, databases, applications, providing the ability to consolidate monitored data to help avoid missing crucial events. The system 240 can perform correlation by looking for common attributes to link events together into meaningful bundles. Accordingly, the system 240 provides the ability to perform a variety of correlation techniques to integrate different sources, in order to turn data into useful information. The system 240 can use the automated analysis of correlated events for the production of alerts, to notify of immediate issues. The system 240 can provide dashboards tools which take event data and turn it into informational charts to assist in seeing patterns, or identifying activity that is not forming a standard pattern. The system 240 can be employed to automate the gathering of compliance data, producing reports that adapt to existing security, governance and auditing processes. Also, the system 240 can employ long-term storage of historical data to facilitate correlation of data over time, and to provide the retention necessary for compliance requirements. In an exemplary embodiment, the system 240 can be a server (or cluster of servers) such as the server 300 described in FIG. 3.

In an exemplary embodiment, the system 240 is a system, appliance, etc. located within the enterprise 200, i.e., inside an enterprise firewall, a Network Address Translation (NAT) device, a Web Proxy service, etc. As such, the system 240 utilizes simple, insecure protocols to aggregate events in the enterprise 200. For example, these protocols can include Simple Network Management Protocol (SNMP), Syslog, and the like. For example, using SNMP, the system 240 can receive notifications via traps. Note, the distributed security system 100 is external to the enterprise 200, i.e., outside the enterprise firewall, the NAT device, the Web Proxy service, etc. Thus, it is not possible to use the simple, insecure protocols between the system 100 and the system 240. Accordingly, the system 100 can include a logging agent (LA) 250 within the enterprise 200. Generally, the logging agent 250 is configured to pull and/or be pushed data from the system 100 for the system 240. In an exemplary embodiment, the logging agent 250 can communicate securely through the enterprise firewall to the system 100. For example, the logging agent 250 can communicate via Secure Socket Layer (SSL) with the system 100, e.g. via the logging nodes 140. Within the enterprise 200, the logging agent 250 can communicate to the system 240 using a variety of protocols. For example, assuming the system 240 is a conventional SIEM system, the logging agent 250 can be configured to provide events and data to the system 240 using whatever methods the conventional SIEM system is setup to use, e.g., SNMP, Syslog, etc. Generally, the logging agent 250 provides the functionality of the external service bridge. The logging agent 250 can be a virtual machine (VM) on a server.

Figure 2:
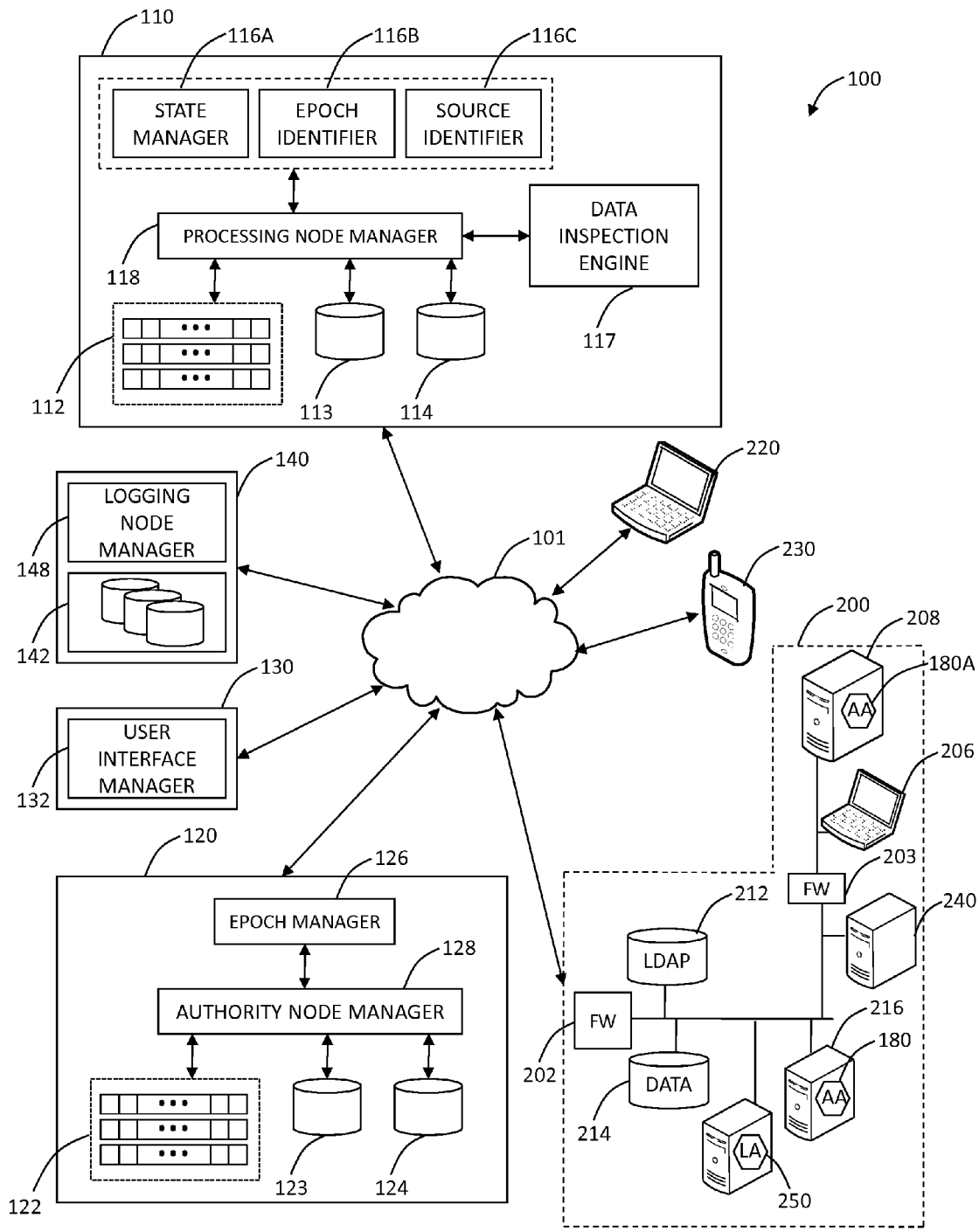
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there can be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 therebetween. The external systems 200, 220 and 230 likewise communicate over the WAN 101 with each other or other data providers and publishers (not shown), i.e., any content on any network. Some or all of the data communication of each of the external systems 200 or devices 220, 230 may be processed through the processing node 110.

FIG. 2 also shows the enterprise 200 in more detail. The enterprise 200 can, for example, include a firewall (FW) 202 protecting an internal network that may include one or more enterprise servers 216, a lightweight directory access protocol (LDAP) server 212, and other data or data stores 214. Another firewall 203 can protect an enterprise subnet that can include user computers 206 and 208 (e.g., laptop and desktop computers). The enterprise 200 can communicate with the WAN 101 through one or more network devices, such as a router, gateway, switch, etc. The LDAP server 212 can store, for example, user login credentials for registered users of the enterprise 200 system. Such credentials can include a user identifiers, login passwords, and a login history associated with each user identifier. The other data stores 214 can include sensitive information, such as bank records, medical records, trade secret information, or any other information warranting protection by one or more security measures. It should be appreciated by those of ordinary skill in the art that FIG. 2 depicts the system 100 and the enterprise 200 in an oversimplified manner, and a practical embodiment may include additional devices that are not described in detail herein.

In an exemplary embodiment, a client access agent 180*a* can be included on a client computer 208. The client access agent 180*a* can, for example, facilitate security processing by providing a hash index of files on the user computer 208 to a processing node 110 for malware, virus detection, etc. Other security operations can also be facilitated by the access agent 180*a*, and the client access agent 180*a* can be installed on any computing device. In another exemplary embodiment, a server access agent 180 can facilitate authentication functions with the processing node 110, e.g., by assigning tokens for passwords and sending only the tokens to the processing node 110 so that transmission of passwords beyond the network edge of the enterprise 200 is minimized. Other functions and processes can also be facilitated by the server access agent 180*b*. The computer device 220 and the mobile device 230 can also store information warranting security measures, such as personal bank records, medical information, and login information, e.g., login information to the server 216 of the enterprise 200, or to some other secured data provider server.

In an exemplary embodiment, the processing nodes 110 are external to network edges of the external systems 200, 220 and 230. That is, the processing nodes 110 are connected to the external systems 200, 220 and 230, and not physically part thereof. For example, the processing nodes 110 could be located at data centers and the like and the external systems 200, 220 and 230 can connect to the processing nodes 110 through various networks over various network connectivity types (e.g., wireless, wired, etc.). Each of the processing nodes 110 stores security policies 113 received from the authority node 120 and monitors content items requested by or sent from the external systems 200, 220 and 230. In an exemplary embodiment, each of the processing nodes 110 can also store a detection process filter 112 and/or threat data 114 to facilitate the decision of whether a content item should be processed for threat detection. A processing node manager 118 can manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item can be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 can include a state manager 116A. The state manager 116A can be used to maintain the authentication and the authorization states of users that submit requests to the processing node 110. Maintenance of the states through the state manager 116A can minimize the number of authentication and authorization transactions that are necessary to process a request. An example of this state management is described in commonly assigned U.S. patent application Ser. No. 12/179,377, filed Jul. 24, 2008, and entitled "HTTP AUTHENTICATION AND AUTHORIZATION MANAGEMENT," the contents of which are incorporated by reference herein. Note, authentication determines who a user is whereas authorization determines if the user is authorized to do a certain thing. The processing node 110 can also include an epoch processor 116B. The epoch processor 116B can be used to analyze authentication data that originated at the authority node 120. The epoch processor 116B can use an epoch ID to further validate the authenticity of authentication data. The processing node 110 can further include a source processor 116C. The source processor 116C can be used to verify the source of authorization and authentication data. The source processor 116C can identify improperly obtained authorization and authentication data, enhancing the security of the network. Collectively, the state manager 116A, the epoch processor 116B, and the source processor 116C operate as data inspection engines.

Because the amount of data being processed by the processing nodes 110 can be substantial, the detection processing filter 112 can be used as the first stage of an information lookup procedure. For example, the detection processing filter 112 can be used as a front end to a looking of the threat data 114. Content items can be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 can identify the Uniform Resource Locator (URL) address of URL requests as the information key and hash the URL address; or can identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 can improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances can include, for example, whether a given file has been virus scanned, whether content at a given URL has been scanned for inappropriate (e.g., pornographic) content, whether a given fingerprint matches any of a set of stored documents, whether data contains data leakage prevention terms, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 can be a Bloom filter implemented by a single hash function. The Bloom filter can be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 can be distributed to the processing nodes 110, which then store a local copy of the detection processing filter 112.

In an exemplary embodiment, the authority node 120 can include an epoch manager 126. The epoch manager 126 can be used to generate authentication data associated with an epoch ID. The epoch ID of the authentication data is a verifiable attribute of the authentication data that can be used to identify fraudulently created authentication data. In an exemplary embodiment, the detection processing filter 122 can be a guard table. The processing node 110 can, for example, use the information in the local detection processing filter 112 to quickly determine the presence and/or absence of information, e.g., whether a particular URL has been checked for malware; whether a particular executable has been virus scanned, etc. The authority node 120 can also store master threat data 124. The master threat data 124 can classify content items by threat classifications, e.g., a list of known viruses, a list of known malware sites, spam email domains, list of known or detected phishing sites, data leakage terms, etc. The authority node manager 128 can be used to manage the master threat data 124, e.g., receive updates from the processing nodes 110 when one of the processing nodes 110 has processed a content item and update the master threat data 124 with any pertinent results. In some implementations, the master threat data 124 can be distributed to the processing nodes 110, which then store a local copy of the threat data 114. In another exemplary embodiment, the authority node 120 can also monitor the health of each of the processing nodes 110, e.g., the resource availability in each of the processing nodes 110, detection of link failures, etc. Based on the observed health of each of the processing nodes 110, the authority node 120 can redirect traffic among the processing nodes 110 and/or balance traffic among the processing nodes 110. Other remedial actions and processes can also be facilitated by the authority node 120.

The processing node 110 and the authority node 120 can be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 can manage the content item according to the security classification of the content item and the security policy of the external system. If, however, the content item is determined to not be classified by the threat data 114, then the processing node manager 118 can cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 can automatically transmit the updated threat data to the other processing nodes 110. Accordingly, threat data for new threats as the new threats are encountered are automatically distributed to each processing node 110. Upon receiving the new threat data from the authority node 120, each of processing node managers 118 can store the updated threat data in the locally stored threat data 114. In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 can manage the content item according to the security classification of the content item and the security policy of the external system. If, however, the content item is determined to not be classified by the threat data, then the processing node manager 118 can request responsive threat data for the content item from the authority node 120. Because processing a content item can consume valuable resource and time, in some implementations the processing node 110 can first check with the authority node 120 for threat data 114 before committing such processing resources.

The authority node manager 128 can receive the responsive threat data request from the processing node 110 and can determine if the responsive threat data is stored in the authority node data store. If responsive threat data is stored in the master threat data 124, then the authority node manager 128 provide a reply that includes the responsive threat data to the processing node 110 so that the processing node manager 118 can manage the content item in accordance with the security policy data 113 and the classification of the content item. Conversely, if the authority node manager 128 determines that responsive threat data is not stored in the master threat data 124, then the authority node manager 128 can provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it can determine if the content item is classified by the threat data 114. Because the detection process filter 112 has the potential for a false positive, a lookup in the threat data 114 can be implemented to ensure that a false positive has not occurred. The initial check of the detection process filter 112, however, can eliminate many null queries to the threat data 114, which, in turn, conserves system resources and increases efficiency. If the content item is classified by the threat data 114, then the processing node manager 118 can manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, can update the master threat data 124 and the master detection process filter 122 stored in the authority node data store according to the threat data update received from the processing node 110. In an exemplary embodiment, the authority node manager 128 can automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114. In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it can determine if the content item is classified by the threat data 114. Because the detection process filter 112 has the potential for a false positive, a lookup in the threat data 114 can be implemented to ensure that a false positive has not occurred. The initial check of the detection process filter 112, however, can eliminate many null queries to the threat data 114, which, in turn, conserves system resources and increases efficiency. If the processing node manager 118 determines that the content item has not been processed, it can request responsive threat data for the content item from the authority node 120. Because processing a content item may consume valuable resource and time, in some implementations the processing node 110 can first check with the authority node 120 for threat data 114 before committing such processing resources.

The authority node manager 128 can receive the responsive threat data request from the processing node 110 and can determine if the responsive threat data is stored in the authority node 120 data store. If responsive threat data is stored in the master threat data 124, then the authority node manager 128 provides a reply that includes the responsive threat data to the processing node 110 so that the processing node manager 118 can manage the content item in accordance with the security policy data 113 and the classification of the content item, and further update the local detection processing filter 112. Conversely, if the authority node manager 128 determines that responsive threat data is not stored in the master threat data 124, then the authority node manager 128 can provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated herewith. The data inspection engines 116, processing node manager 118, authority node manager 128, user interface manager 132, logging node manager 148, and access agent 180 can be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

The logging nodes 140 can include the logging node manager 148 that is communicatively coupled to data stores 142. As described herein, each of the logging nodes 140 can store data related to security operations and network traffic processed by the processing nodes 110 for each external system. In an exemplary embodiment, the logging nodes 140 can provide web logs of all visited URLs by user and the like. The logging nodes 140 can also log other data based on any number of parameters for future reporting, correlating, analysis, etc. As described in FIG. 1, the internal management system 240 is within the enterprise 200 behind the firewall 202. The systems and methods provide a mechanism for integrating data from the logging nodes 140 (or any other devices associated with the system 100) with the internal management system 240 through the logging agent 250. Thus, any transaction log in the system 100 can be ported to the system 240. Further, the systems and methods can include filtering aspects to provide some and/or all items to the system 240.

Referring to FIG. 3, in an exemplary embodiment, a block diagram illustrates a server 300 which can be used in the system 100 or standalone. Any of the processing nodes 110, the authority nodes 120, and the logging nodes 140 can be formed through one or more servers 300. Further, the computer device 220, the mobile device 230, the servers 208, 216, the internal management system 240, the logging agent 250, etc. can include the server 300 or a similar structure. The server 300 can be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 can be used to receive user input from and/or for providing system output to one or more devices or components. User input can be provided via, for example, a keyboard, touch pad, and/or a mouse. System output can be provided via a display device and a printer (not shown). I/O interfaces 304 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 can be used to enable the server 300 to communicate on a network, such as the Internet, the WAN 101, the enterprise 200, and the like, etc. The network interface 306 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 300 such as, for example, an internal hard drive connected to the local interface 312 in the server 300. Additionally in another embodiment, the data store 308 can be located external to the server 300 such as, for example, an external hard drive connected to the I/O interfaces 304 (e.g., SCSI or USB connection). In a further embodiment, the data store 308 can be connected to the server 300 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The software in memory 310 can include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Figure 4:
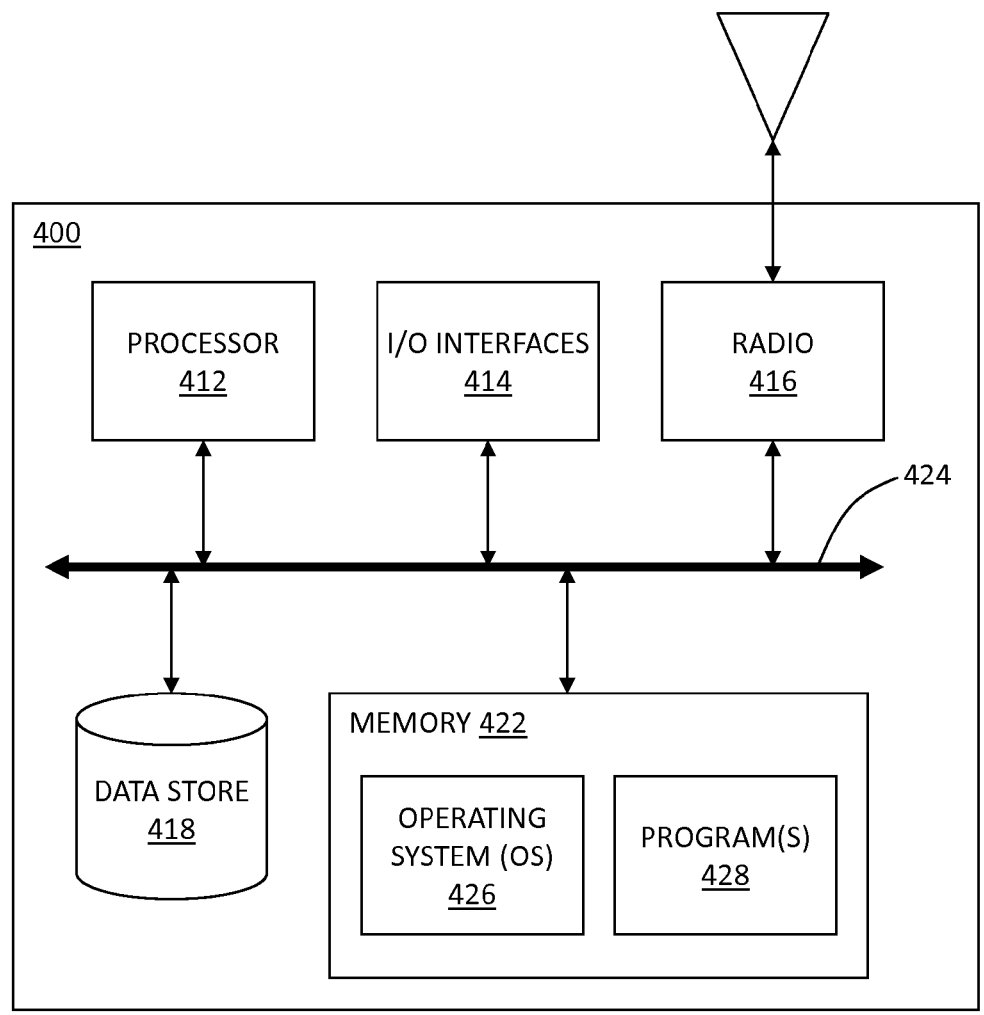
FIG. 4 is a block diagram of a mobile device which may be used in the distributed security system of FIG. 1 or with any other cloud-based system.

Referring to FIG. 4, in an exemplary embodiment, a block diagram illustrates a mobile device 400, which can be used in the system 100 or the like. The mobile device 400 can be a digital device that, in terms of hardware architecture, generally includes a processor 412, input/output (I/O) interfaces 414, a radio 416, a data store 418, and memory 422. It should be appreciated by those of ordinary skill in the art that FIG. 4 depicts the mobile device 400 in an oversimplified manner, and a practical embodiment can include additional components and suitably configured processing logic to support known or conventional operating features that are not described in detail herein. The components (412, 414, 416, 418, and 422) are communicatively coupled via a local interface 424. The local interface 424 can be, for example but not limited to, one or more buses or other wired or wireless connections, as is known in the art. The local interface 424 can have additional elements, which are omitted for simplicity, such as controllers, buffers (caches), drivers, repeaters, and receivers, among many others, to enable communications. Further, the local interface 424 may include address, control, and/or data connections to enable appropriate communications among the aforementioned components.

The processor 412 is a hardware device for executing software instructions. The processor 412 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 412 is configured to execute software stored within the memory 422, to communicate data to and from the memory 422, and to generally control operations of the mobile device 410 pursuant to the software instructions. In an exemplary embodiment, the processor 412 may include a mobile optimized processor such as optimized for power consumption and mobile applications. The I/O interfaces 414 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 414 can also include, for example, a serial port, a parallel port, a small computer system interface (SCSI), an infrared (IR) interface, a radio frequency (RF) interface, a universal serial bus (USB) interface, and the like. The I/O interfaces 414 can include a graphical user interface (GUI) that enables a user to interact with the mobile device 400. Additionally, the I/O interfaces 414 may further include an imaging device, i.e. camera, video camera, etc.

The radio 416 enables wireless communication to an external access device or network. Any number of suitable wireless data communication protocols, techniques, or methodologies can be supported by the radio 416, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 418 can be used to store data. The data store 418 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 418 can incorporate electronic, magnetic, optical, and/or other types of storage media.

The memory 422 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 422 may incorporate electronic, magnetic, optical, and/or other types of storage media. Note that the memory 422 can have a distributed architecture, where various components are situated remotely from one another, but can be accessed by the processor 412. The software in memory 422 can include one or more software programs, each of which includes an ordered listing of executable instructions for implementing logical functions. In the example of FIG. 4, the software in the memory system 422 includes a suitable operating system (O/S) 426 and programs 428. The operating system 426 essentially controls the execution of other computer programs, and provides scheduling, input-output control, file and data management, memory management, and communication control and related services. The programs 428 can include various applications, add-ons, etc. configured to provide end user functionality with the mobile device 400. For example, exemplary programs 428 can include, but not limited to, a web browser, social networking applications, streaming media applications, games, mapping and location applications, electronic mail applications, financial applications, and the like.

Figure 5:
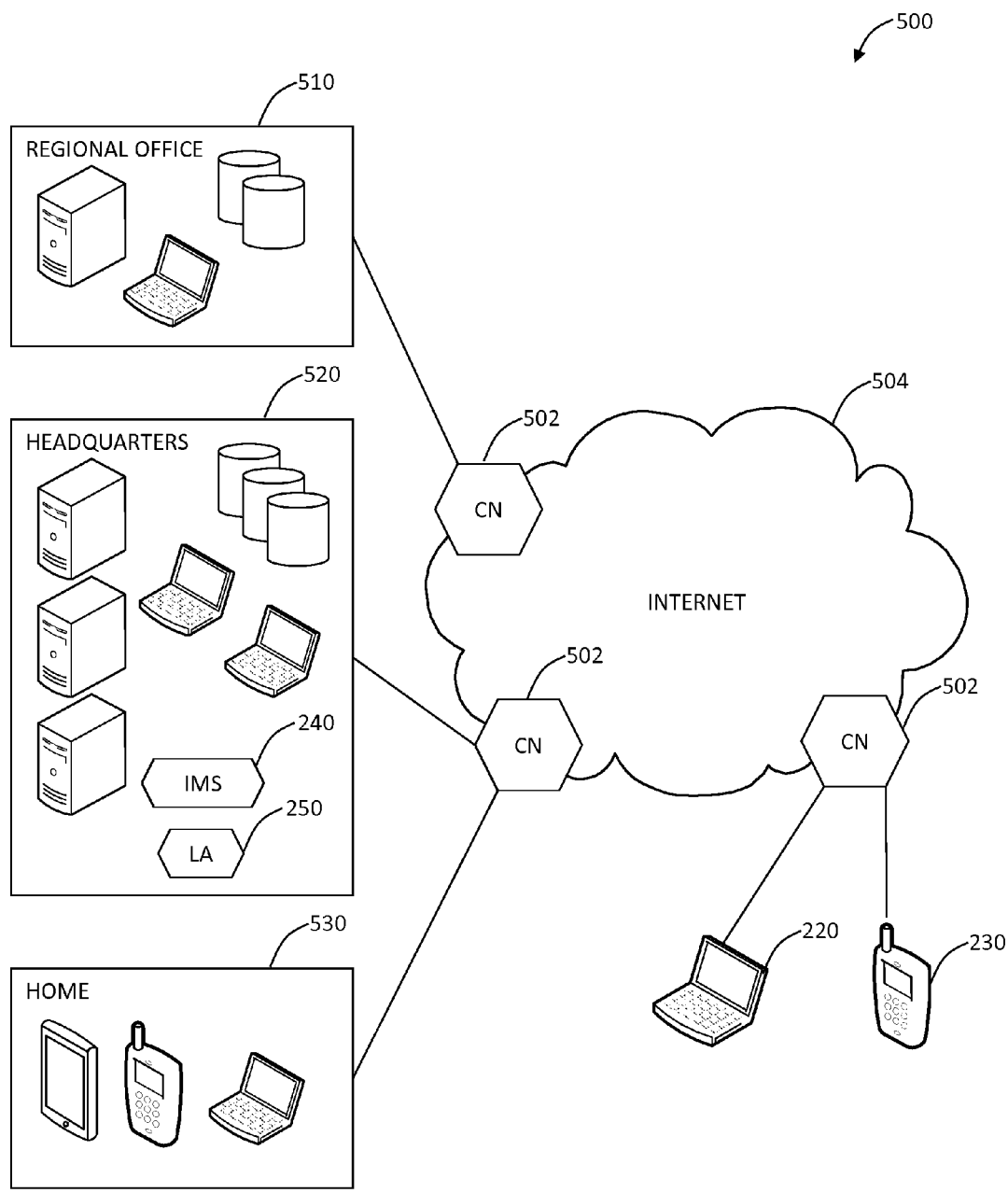
FIG. 5 is a network diagram of another cloud system which can implement the archiving systems and methods.

Referring to FIG. 5, in an exemplary embodiment, another exemplary cloud system 500 is illustrated for providing cloud-based services. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud based system. In the cloud system 500, traffic from various locations (and various devices located therein) such as a regional office 510, headquarters 520, various employees' homes 530, a mobile laptop 220, and a mobile device 230 is redirected to the cloud through the cloud nodes 502. That is, each of the locations 510, 520, 530, 220, 230 is communicatively coupled to the Internet 504 through the cloud nodes 502. The cloud system 500 can be configured to perform various functions such as spam filtering, uniform resource locator (URL) filtering, antivirus protection, bandwidth control, data loss prevention, zero day vulnerability protection, web 2.0 features, and the like. In an exemplary embodiment, the cloud system 500 and the distributed security system 100 can be viewed as Security-as-a-Service through the cloud.

Architecturally, the systems 100, 500 generally at least include the processing nodes 110 and the cloud nodes 502 for interfacing with the users 510, 520, 530, 220, 230. In an exemplary embodiment, all functions described herein can be incorporated in the processing nodes 110 and the cloud nodes 502. In another exemplary embodiment, the functions can be distributed. For example, the system 500 includes the singular cloud nodes 502 while the system 100 includes the processing nodes 110, the authority nodes 120, the logging nodes 140, etc. The term node as used herein can be a single computer, a cluster of servers, or a functional module running on a computer, server, etc. The cloud system 500 can also include the internal management system 240 and the logging agent 250. Specifically, data logs kept in the cloud system 500 can be provided in full or part of the internal management system 240 via the logging agent 250. Note, the cloud system 500 can perform data logging functionality at the cloud nodes 502 with the cloud nodes 502 configured to interface securely with the logging agent 250.

Figure 6:
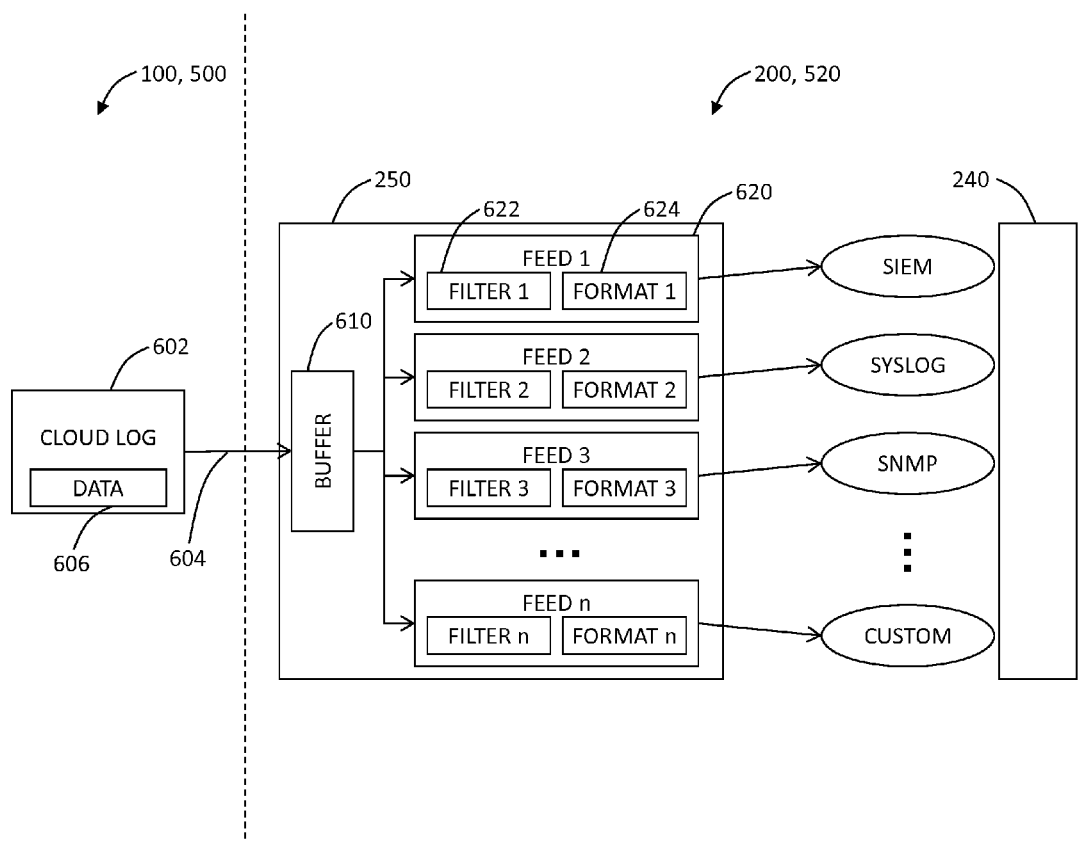
FIG. 6 is a network diagram of an exemplary operation of a logging agent interfacing with a cloud log source and an internal management system.

Referring to FIG. 6, in an exemplary embodiment, a network diagram illustrates an exemplary operation of the logging agent 250 interfacing with a cloud log 602 source and the internal management system 240. The cloud log 602 source is located in the cloud system 100, 500, and the logging agent 250 and the internal management system 240 are located in the enterprise 200, 520 behind a firewall associated therewith. The cloud log 602 source can be the logging node 140, the cloud node 502, or any device configured to stream transactions, events, logs, etc. from the cloud system 100, 500 to the logging agent 250. The logging agent 250 has a communications link 604 to the cloud log 602 source that is secure and bypasses the firewall associated with the enterprise 200, 520. For example, the communications link 604 can include an SSL link, a Transport Layer Security (TLS) link, or any general type of link provided some level of security over the Internet. For example, the communications link 604 can be TLS as defined in RFC 5246, "The Transport Layer Security (TLS) Protocol," Version 1.2, August 2008, the contents of which are incorporated by reference herein. The communications link 604 could also be a Virtual Private Network (VPN) link between the cloud log 602 source and the logging agent 250 with the VPN being any known VPN protocol such as Internet Protocol Security (IPsec), SSL/TLS, Datagram Transport Layer Security (DTLS), Microsoft Point-to-Point Encryption (MPPE), Secure Socket Tunneling Protocol (SSTP), and the like. The communications link 604 can be either always-on, established on-demand, established periodically, etc.

The cloud log 602 source is configured to send data 606, i.e. transactions, logs, events, etc., over the communications link 604 to a buffer 610 in the logging agent 250. In particular, the cloud log 602 source is configured to perform a first line of filtering where the data 606 is only data related to the enterprise 200, 520. In an exemplary embodiment, the cloud log 602 source sends the data 606 in a compressed format over the communications link 604. Examples of this compressed format are disclosed in commonly assigned U.S. patent application Ser. No. 12/185,443 filed Aug. 4, 2008 and entitled "ENCODING AND COMPRESSION OF STATISTICAL DATA," the contents of which are incorporated by reference herein. The buffer 610 can include memory to store a certain amount of data from the cloud log 602 source. Note, the data 606 stored in the buffer 610 can be compressed as well. The logging agent 250 can also include a flow control method to ensure there is not a buffer overrun in the buffer 610. From the buffer 610, the logging agent 250 is configured to perform a second line of filtering to transmit the data to the internal management system 240 or the like.

In an exemplary embodiment, the logging agent 250 can provide one or more feeds 620 from the buffer 610. The feeds 620 include a stream of data from the buffer 610. Each feed 620 has a filter 622 which specifies which data from the buffer 610 should be included in the feed 620 and a format 624 which specifies an output format for the feed 620. The format 624 can be any type of format required by the system 240 such as a specific SIEM format, Syslog, SNMP, Splunk, Arcsight, RSA Envision, QRadar, or any custom format. Also, the logging agent 250 could directly input the feeds 620 into the internal management system 240. In an exemplary embodiment, the logging agent 250 and the internal management system 240 can be on separate servers and the logging agent 250 can be configured to physically output the format 624 for each of the feeds 620 on a network associated with the enterprise 200, 520 to the internal management system 240. In another exemplary embodiment, the logging agent 250 and the internal management system 240 can be on a same server and there can be integration therebetween where the data from the feeds 620 is simply provided to the internal management system 240. Functionally, the logging agent 250 is an external service bridge which securely receives data from the cloud system 100, 500 and provides this data to the internal management system 240 in whatever format is required. Thus, the enterprise 200, 520 can interoperate existing systems 240 with the cloud system 100, 500.

The data 606 can be singular records related to some activity in the cloud system 100, 500 from or to the cloud system 100, 500. The logging agent 250 is configured to take the data 606 and provide it to the system 240. This can be accomplished via the feeds 620. Each feed 620 is a stream of an output sequence of records sent by the logging agent 250. In an exemplary embodiment, the feed 620 is in American Standard Code for Information Interchange (ASCII) format and sent over a Transmission Control Protocol (TCP) connection inside the enterprise 200, 520. As described herein, the feed 620 and its associated output stream includes two major parts: the filter 622 and the format

624. In an exemplary embodiment, the feed 620 can be one of two different types: a weblog transaction stream and an event based stream. The weblog transaction stream is for transaction logs and the associated filters 622 and formats 624 are based on the fields in the transaction logs. The filters 622 can be used to determine which transactions to include such as based on user identification, user department, user location, transaction type (e.g., email, URL, etc.), and the like. The event based stream is only for events in the cloud system 100, 500. For example, a user closing a connection in the cloud system 100, 500 can be an event, detecting suspicious content can be an event, general statistics about the cloud system 100, 500 can be events, etc.

FIG. 6 illustrates that transactions and/or events can be lumped into the data 606. Specifically, the data 606 can simply be raw data sent to the buffer 610. The logging agent 250 is configured to parse through the buffer 610 and provide the data 606 to one or more of the feeds 620. Note, the correspondence between the data 606 to the feeds 620 can be one to many, i.e. a particular record in the data 606 can go to one or more feeds 620. In an exemplary embodiment, FIG. 6 is illustrating transaction-based streams of the data 606 to the feeds 620. That is, the logging agent 250 is configured to take transactions from the data 606 and send them to the appropriate feeds 620. The concept of the feeds 620 is an abstraction inside the logging agent 250. The logging agent 250 treats each feed as a separate entity, and each feed 620 can include an identifier, a stream of data, and a TCP connection for an output of the stream. The relationship between each feed 620 and its output TCP connection is one to one. Each of the feeds 620 is connected to a physical device, i.e. the system 240 or the like. From a relationship perspective, each feed 620 is coupled to an associated stream of the data 606, i.e. a one to one relationship, but multiple feeds 620 can be connected to the same system 240, i.e. a many to one relationship between the system 240 and the feeds 620. Note, even though multiple feeds 620 can connect to the same system 240, internally the individual feeds 620 can have different TCP connections, i.e., there will be multiple TCP connection to the system 240.

In an exemplary embodiment, the data 606 can be in a compressed format through the logging agent 240 as well as through to the system 240. In this exemplary embodiment, the feeds 620 and their associated TCP connections are reduced in size relative to uncompressed data 606 thereby reducing network bandwidth in the enterprise 200, 520 and in the cloud system 100, 500. In another exemplary embodiment, the data 606 can be in a compressed format only from the cloud log 602 source to the buffer 610 and then decompressed by the logging agent 250. The compressed format can include Presence Vector, Differential Compression, Zero Byte Compression, Opcode compression, LZ77, Delta Compression, 1 bit compression, and the like. In operation, the data 606 can include different data types such as constant data, time varying and predictable data, occasionally occurring data, time varying and linear data, whole records of data, time varying data, data that varies by one, and the like. For example, the following table provides examples of the types of compression that can be used for the different data types in the data 606.

| Data Type | Compression Process | Typical compression ratio |
| --- | --- | --- |
| Constant Data | Presence Vector | 1:50 |
| Time varying, predictable | Differential Compression | 1:4 |

-continued

| Data Type | Compression Process | Typical compression ratio |
| --- | --- | --- |
| Occasional Occurrence | Zero Byte Compression | High (1:100) |
| Time varying, linear | Opcode compression | 1:8 |
| Whole records | LZ77 | 1:4 |
| Time varying | Delta Compression | 1:10 |
| Vary by 1 | 1 bit compression | 1:8 |

Figure 7:
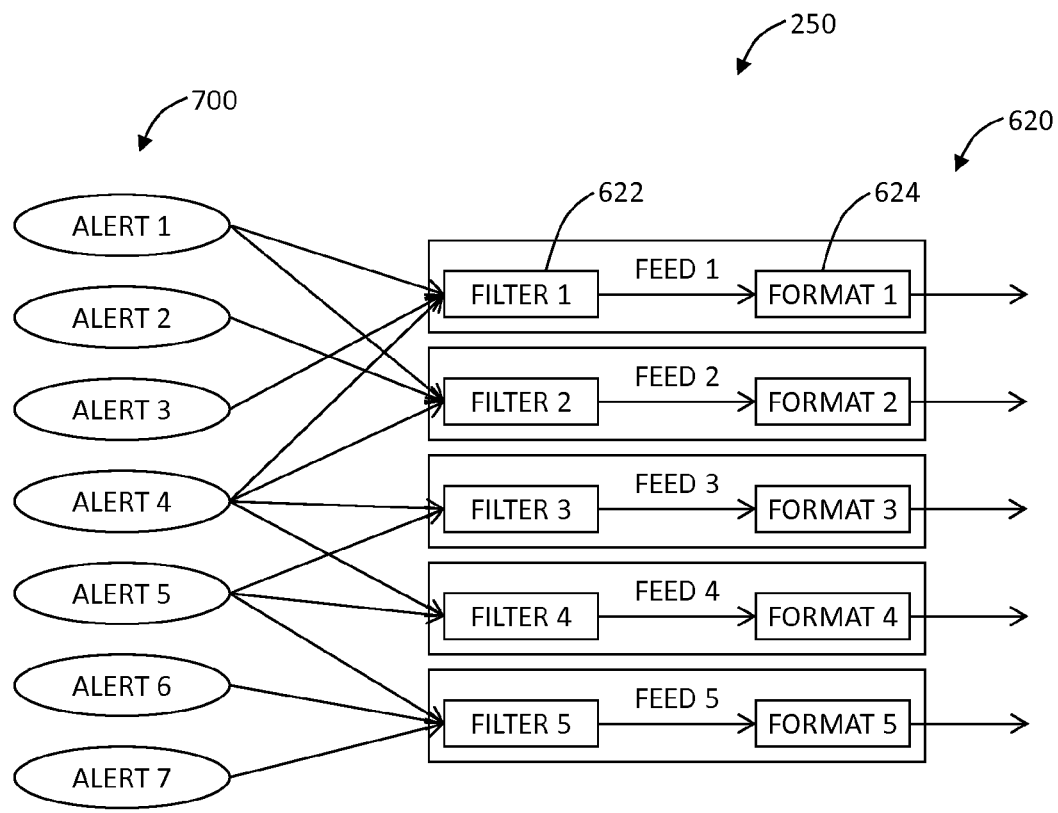
FIG. 7 is a conceptual block diagram of creation of the feeds by the logging agent 250 for event-based streams.

Referring to FIG. 7, in an exemplary embodiment, a conceptual block diagram illustrates creation of the feeds 620 by the logging agent 250 for event-based streams. In an exemplary embodiment, handing event-based streams can be an adaptation of the exemplary embodiment of FIG. 6 for handing transaction-based streams. In context of the event-based streams, the data from the buffer 610 can be viewed as a plurality of alerts 700. In an exemplary embodiment, the buffer 610 will be segmented separating the data 606 between event-based streams and transaction-based streams. This can be done because events are given higher priority and can generated from logging agent 250 itself. In an exemplary embodiment, the buffer 610 can physically be separated so as to avoid mixing the event-based streams and transaction-based streams to avoid losing events. In another exemplary embodiment, the buffer 610 can only be used for the transaction-based streams with any events being immediately sent to the feeds 620 without buffering. For example, the buffer 610 can undergo flow control for transactions, and events based on problems of the buffer 610 cannot be kept on the buffer 610. Note, each of the feeds 620 in addition to the filter 622 and the format 624 can include an identifier to tell the system 240 whether a particular stream is a transaction stream or an event stream.

The plurality alerts 700 can each represent an event. Note, the alerts 700 can be in the buffer 610, derived from the data 606 in the buffer 610, generated by the logging agent 250, received from the cloud log 602 source, etc. As described herein, events can be sent at a higher priority to the feeds 620 than transactions. Each of the alerts 700 can be filtered by event type so a single feed can be made to send different events. Also, the alerts 700 can have a one to many relationship with the feeds 620 as shown in FIG. 7. The event streams over the feeds 620 can be similar to transaction streams over the feeds 620. That is, the event streams will also go through filtering logic first and then if the Alert Passes the filter then it would be converted to a specified format. Each event from the alerts 700 can have a same format which can contain all the possible fields for all the events, and a field that is not relevant to an event is not populated. For example, the foregoing illustrates an exemplary event record.

| Size | Type | Notes |
| --- | --- | --- |
| 8 bits | Event type | An indicator of the type of event |
| 8 bits | Severity | Warning, Critical, Fatal, etc. |
| 8 bits | Reason | Reason for the event |
| 32 bits | IP address | IP address associated with the event |
| 8 bits | Memory utilization | Memory utilization in percent |
| 8 bits | CPU utilization | CPU utilization in percent |

Exemplary events can include connection closure in the system 100, 500, buffer overflow in the logging agent 250, memory utilization, CPU utilization, malicious content detected by the system 100, 500, data leakage detected by the system 100, 500, policy violation detected by the system 100, 500, etc.

Referring back to FIG. 6, the logging agent 250 can be configured to provide flow control with the cloud log 602 source to avoid overruns of the buffer 610. Note, flow control is only needed if the data 606 is being written to the buffer 610 and not immediately sent to the feeds 620. In an exemplary embodiment, the logging agent 250 can monitor the state of the buffer 610 and if a certain threshold is exceeded, the logging agent can apply back pressure on the input connection 604, i.e. the cloud log 602 source can halt transmissions until the buffer 610 is below the threshold. Note, the flow control assumes the logging agent 250 provides a buffer state periodically to the cloud log 602 source. The flow control can operate based on a state of a receiver at the logging agent 250. That is, the flow control can identify misbehaving receivers and throw them out so that the normal functioning of the cloud systems 100, 500 is not disturbed. When a receiver misbehaves it may only be due to a transient network problems, in which case the flow control can accommodate that receiver via the back pressure. When a receiver misbehaves consistently, the flow control needs to determine if the associated logging agent 250 is corrupt, etc.

Whenever the buffer 610 is short on memory, it may be an indication that one or more associated receivers is misbehaving. In such situations, the flow control can be configured to measure a flow rate for each suspect receiver, and a consistently low flow rate can be indicative of a receiver which requires corrective action. In normal operations, the data 606 should represent one second worth of data every second. However, the processing could be delayed resulting in multiple seconds worth of data every second. It such a situation, the back pressure should reduce any flow control problems. Upon resumption of transmission, the cloud log 602 source is again in a burst mode, where multiple seconds worth of data is sent every second to catch up. Thus, under normal conditions, a different between a current time at the logging agent 250 and a current time for the data 606 should be one second. It can be more than one second for the following reasons: (1) some clock is lagging, but this should yield a constant difference; and (2) in burst-mode, the difference can be more than one because of processing old data.

A Flow rate is the amount of the data 606 measured in seconds that the cloud log 602 source is able to push to the logging agent 250 in a clock second. An exemplary calculation of the flow rate includes (note, other calculations are also possible and contemplated):

$$\text{Flow Rate} = \frac{\text{Average outbound data per clock second}}{\text{Average Databytes per weblog\_time\_second}}$$

Every time the weblog_time changes, the flow control can calculate the running average of the databytes sent for that weblog_time. A counter can be maintained which calculates the bytes sent value, tot_databytes_sent, and another variable/counter can be maintained for tot_databytes_sent_prev. Now, cur_bytes_sent=(tot_databytes_sent_prev−tot_databytes_sent) gives the bytes sent for the current_weblog_time. The exponential moving average can be used for the cur_bytes_sent which is Avg_bytes_sent=a*Avg_bytes_sent+(1−a)*cur_bytes_sent, a can be set to 0.5 for ease of calculation. The average outbound data per clock second can be determined from statistics associated with the link 604. For example, an SSL link can include data for these statistics. From this, the flow rate can be calculated. It was determined that an outbound speed at a ratio of 1:10 is ideal, i.e., for every clock time second, about 10 seconds worth of data can be sent from the cloud log 602 source. This ratio can be maintained by monitoring (cur_tot_tx_hold/Avg_bytes_sent) and adjusting accordingly.

In an exemplary embodiment, the buffer 610 has to be a certain size to handle continuous or nearly continuous data flows from the cloud log 602 source. Further, the buffer has to be sized based on an amount of the data flows which is determined by users in the enterprise 200, 520 and activity amounts. For example, the buffer 610 can be sized to handle a certain time amount of data, e.g. one-two hours. Also, as described herein, the link 604 has compressed data whereas data out of the buffer 610 can be uncompressed. As such, the buffer 610 has to accommodate much faster output links than input links, e.g. 100:1. Writing to the buffer 610 is performed as data 606 is provided on the link 604. Reading from the buffer 610 is asynchronous based on where each feed 620 currently is.

In an exemplary embodiment, a system includes an enterprise network comprising an internal management system communicatively coupled thereon, wherein the enterprise network comprises a security device and the internal management system is disposed internally in the enterprise network behind the security device; a cloud system external to the enterprise network and communicatively coupled to the enterprise network, wherein at least one user associated with the enterprise network is configured to communicate through the cloud system for cloud-based services, and wherein the cloud system is configured to log data associated with the at least one user for the cloud-based services; and an external service bridge located internally in the enterprise network behind the security device, wherein the external service bridge is configured to securely communicate with the cloud system to receive the log data, to buffer the received log data, and to communicate with the internal management system to provide the buffered log data thereto via insecure protocols over the enterprise network in a format specified by the internal management system; wherein the cloud-based services comprise security as a service through the cloud system providing security to the at least one user while the at least one user is internal to the enterprise network or external to the enterprise network, and wherein the external service bridge communicates the log data comprising security data associated with the at least one user to the internal management system.

The security device can include at least one of a firewall, a Network Address Translation device or a web proxy service, and wherein the external service bridge is configured to establish a secure communications link to the cloud system through the security device. The external service bridge receives the log data in a compressed format over the secure communications link. The external service bridge performs one of transmitting the log data to one or more feeds or buffering the log data. The external service bridge can include at least one feed configured on which the external service bridge is configured to filter the log data and format the log data for transmission from the external service bridge. The external service bridge can transmit each of the at least one feed as a Transmission Control Protocol stream on one of the enterprise network to a networked storage medium and a local storage medium. The external service bridge interfaces securely to the cloud system and insecurely within the enterprise network to the internal management system. The external service bridge can interface insecurely through any of Simple Network Management Protocol, Syslog, Splunk, Arcsight, RSA Envision, and QRadar.

The internal management system can include a Security Information and Event Management device configured to accept any of Simple Network Management Protocol, Syslog, and Splunk, and the external service bridge can be configured to transparently provide the log data to the internal management system as if the cloud system were within the security. The at least one feed can include a first feed and a second feed, wherein the first feed outputs to Simple Network Management Protocol and the second feed outputs to Syslog. The log data can include one of an Internet transaction stream and an event stream, and wherein the external service bridge comprises a buffer for the log data. The Internet transaction stream can be buffered in the buffered whereas the event stream is directly provided to one or more feeds. The external service bridge can be configured to implement flow control with the cloud system based on the buffer. The external service bridge receives the log data in a format from the logging agent and converts the log data into a format for the internal management system such that the internal management system can interface to the cloud system. The external service bridge segments the log data into event-based streams and transaction-based streams from the cloud system with the buffer configured differently therebetween.

In another exemplary embodiment, a method includes logging transactions and events associated with users of an enterprise network in a management system located internally on the enterprise network; communicating with a cloud system through a secure connection outside the enterprise network, wherein the cloud system is external to the enterprise network and at least one user uses cloud-based services through the cloud system; receiving and buffering log data through the secure connection from the cloud system for the at least one user, wherein the log data comprises transactions and events associated with the at least one user and associated usage of the cloud-based services; and integrating transmitting, via insecure protocols, the log data to the management system from a buffer over the enterprise network in a format specified by the management system; wherein the cloud-based services comprise security as a service through the cloud system providing security to the at least one user while the users are internal to the enterprise network or external to the enterprise network, and wherein the external service bridge communicates the log data comprising security data associated with the users to the internal management system.

In a further exemplary embodiment, an external service bridge includes a network interface communicatively coupled on a secure network, wherein the external service bridge is located internally on the secure network; a processor; and memory storing computer executable instructions, and in response to execution by the processor, the computer executable instructions cause the processing node to perform steps of: establish a secure connection to an external network through the secure network; receive and buffer data from the secure connection; parse the buffered data into one or more feeds; filter and format the data in the one or more feeds; and output the one or more feeds on the secure network via an insecure protocol to an internal management system in a format specified by the internal management system, wherein the format comprises a format expected by the internal management system; wherein the data is from cloud-based services external from the secure network providing security to user while the users are internal to the secure network or external to the secure network, and wherein the external service bridge communicates the data comprising security data associated with the users to the internal management system as if the cloud-based services where internal to the secure network. The external network includes a cloud system and wherein the data includes transactions and events associated with users from the secure network operating cloud-based services in the cloud system.

Figure 8:
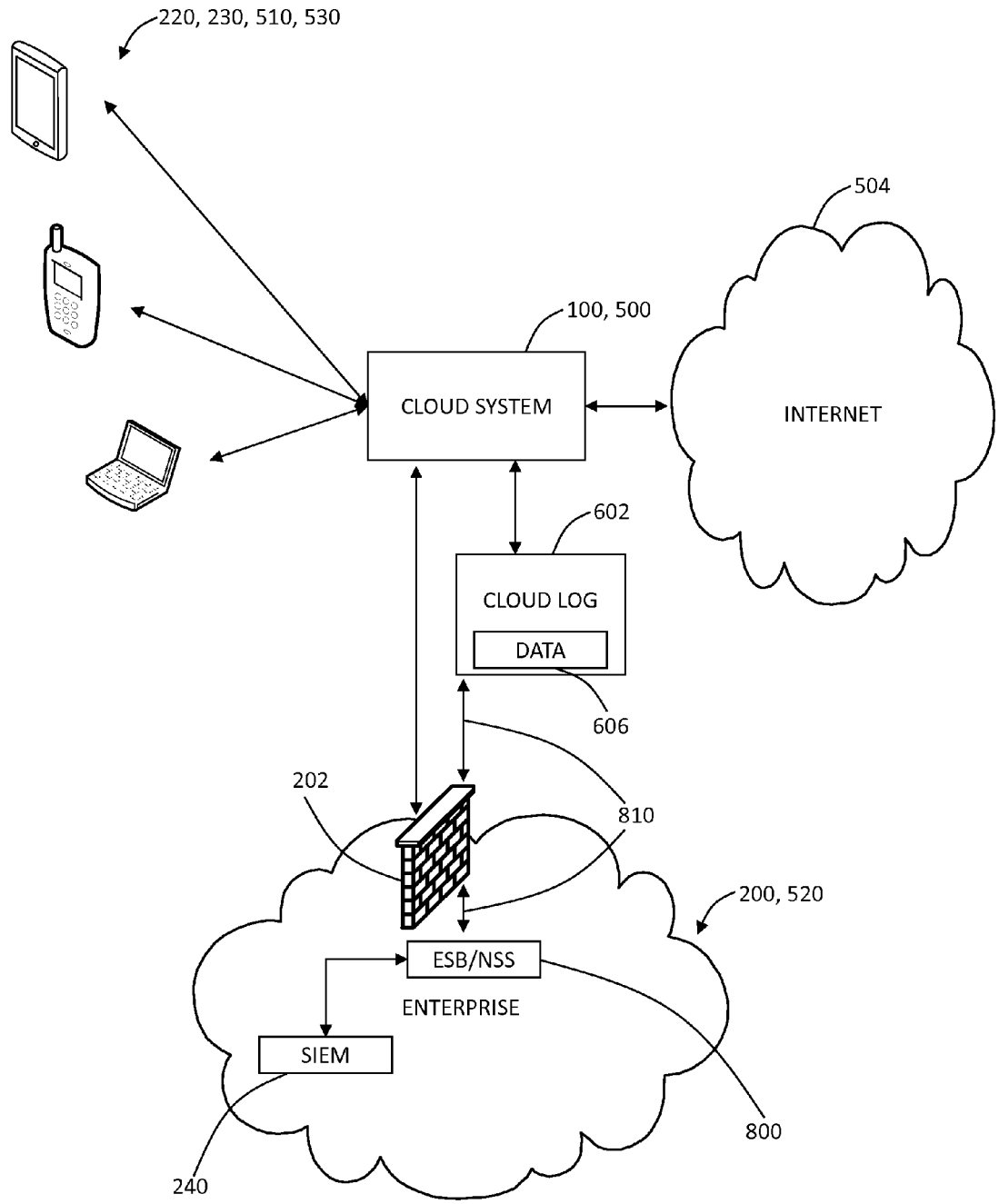
FIG. 8 is a network diagram of an application of an external services bridge (ESB) in an enterprise or headquarters network.

Referring to FIG. 8, in an exemplary embodiment, a network diagram illustrates an application of an external services bridge (ESB) 800 in an enterprise 200 or headquarters 520 network. Again, the cloud systems 100, 500 are utilized to monitor and protect various users 220, 230, regardless of location (i.e., at or outside the enterprise 200, regional offices 510, headquarters 520, various employee's homes 530, etc.). The cloud systems 100, 500 ensure advanced security and policy compliance for all users, across all devices and locations while simultaneously providing IT administrators' in-depth visibility and control over all their user traffic. In the various exemplary embodiments described herein, the external services bridge (ESB) 800 provides an ability to consolidate logs from all users globally into a central repository in real time. The external services bridge (ESB) 800 has been described herein as a server, appliance, etc. located in the enterprise 200 to bridge the cloud system 100, 500 logs, the cloud log 602 source, through the firewall 202, allowing for integration with the internal management system 240, e.g. a SIEM system. The external services bridge (ESB) 800 can also be realized as a service, virtualized in various hardware devices and/or integrated in the firewall 202, such as a Nanolog Streaming Service (NSS), available from Zscaler, Inc., the assignee of the present application.

The present invention is an innovative system which provides IT administrators with a single point of reference where they can view and mine a plethora of transaction information across multiple devices, applications and locations. With the present invention, businesses are able to effectively log information from all users, regardless of the device they are using and the location where they are based. Each log generated is then transmitted to the SIEM system, the internal management system 240. In addition there is a protective log buffer which mitigates the risk of data loss in the event of system failure or downtime. The system can be effectively controlled by IT management and administrators, who can configure specific actions which automatically pre-process logs and only submit logs to SIEM which are relevant. In addition the system can work extremely well when integrated with several SIEMS, supporting ASCII formats.

For organizations that need to transfer their weblogs from the cloud system 100, 500 to the enterprise SIEM, the present invention can enable the Nanolog Streaming Service (NSS) or ESB 800 as an optional add-on feature. For example, the NSS is provided as a virtual machine installed within the customer's network, the enterprise 200. NSS connects to the cloud log 602 source and streams out all logs for the company to the corporate SIEM or other storage devices, the internal management system 240, in real-time. The protocol used by NSS to retrieve logs from the cloud is highly secure and guarantees that the logs cannot be tampered with in transit. By using NSS, customers can ensure compliance with regulatory mandates on local log archival. Sending web log data to the SIEM also facilitates log correlation from multiple devices, thus allowing organizations to analyze traffic patterns across their entire network.

Additionally, organizations can leverage web log data in the SIEM to conduct extended historical analysis (>6 months).

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A method of integrating log data from a cloud system with an internal management system, wherein the cloud system is located externally from a secure network which contains the internal management system, the method comprising:
receiving log data from a cloud log in a cloud system through a secure connection between an agent in the secure network and the cloud system, wherein the cloud log stores the log data related to processing in the cloud system;
buffering the received log data at the agent and controlling the flow from the cloud log to the agent based on the buffering;
filtering the buffered, received log data at the agent; and
transmitting the filtered, buffered, received log data by the agent via simple, insecure protocols inside the secure network to the internal management system in a format of a plurality of formats associated with the internal management system,
wherein the agent is configured to receive the log data in real time from the cloud log and to provide to the internal management system, and wherein the agent is configured to control the flow by monitoring a flow rate and causing the flow to change based thereon to accommodate the log data in real time.

2. The method of claim 1, wherein the internal management system is a Security Information and Event Management (SIEM) system, and the method is performed via the agent comprising an external service bridge which is located within the secure network.

3. The method of claim 2, wherein the external service bridge is any of a server, an appliance, a service operating on a virtual machine, and a service operating on a hardware device inside the secure network.

4. The method of claim 1, wherein the log data undergoes a first line of filtering in the cloud system and a second line of filtering within the secure network, prior to being sent to the internal management system.

5. The method of claim 1, wherein the cloud system is configured to proactively detect and preclude distribution of security threats between users associated with the secure network and the Internet, and wherein the security threats comprise any of malware, spyware, viruses, trojans, botnets, email spam, data leakage, policy violations, and other undesirable content.

6. The method of claim 1, wherein the format is American Standard Code for Information Interchange (ASCII) format and the transmitting is over a Transmission Control Protocol (TCP) connection inside the secure network.

7. The method of claim 1, wherein the internal management system is configured to perform any of data aggregation, correlation, alerting, dashboard, compliance, and retention of data.

8. The method of claim 1, wherein the internal management system is a first internal management system of a plurality of internal management systems, and the method further comprising:
transmitting the filtered, buffered, received log data accordingly to each of the plurality of internal management systems in an associated format.

9. The method of claim 8, wherein a record of the filtered, buffered, received log data is sent to at least two of the plurality of internal management systems.

10. A system configured to integrate log data from a cloud system with an internal management system, wherein the cloud system is located externally from a secure network which contains the internal management system, the system comprising:
a network interface communicatively coupled to the secure network and the cloud system;
a processor communicatively coupled to the network interface and a data store; and
memory storing instructions that, when executed, cause the processor to
obtain log data from a cloud log in the cloud system through a secure connection, via the network interface, between an agent in the secure network and the cloud system, wherein the cloud log stores the log data related to processing in the cloud system;
buffer the received log data at the agent in the data store and control the flow from the cloud log to the agent based on the buffer;
filter the buffered, received log data at the agent; and
cause transmission of the filtered, buffered, received log data by the agent to the internal management system, via the network interface and via simple, insecure protocols inside the secure network, in a format associated with the internal management system,
wherein the agent is configured to receive the log data in real time from the cloud log and to provide to the internal management system, and wherein the agent is configured to control the flow by monitoring a flow rate and causing the flow to change based thereon to accommodate the log data in real time.

11. The system of claim 10, wherein the internal management system is a Security Information and Event Management (SIEM) system, and the agent is an external service bridge which is located within the secure network.

12. The system of claim 11, wherein the external service bridge is any of a server, an appliance, a service operating on a virtual machine, and a service operating on a hardware device inside the secure network.

13. The system of claim 10, wherein the log data undergoes a first line of filtering in the cloud system and a second line of filtering within the secure network, prior to being sent to the internal management system.

14. The system of claim 10, wherein the cloud system is configured to proactively detect and preclude distribution of security threats between users associated with the secure network and the Internet, and wherein the security threats comprise any of malware, spyware, viruses, trojans, botnets, email spam, data leakage, policy violations, and other undesirable content.

15. The system of claim 10, wherein the format is American Standard Code for Information Interchange (ASCII) format and the network interface is configured to transmit over a Transmission Control Protocol (TCP) connection inside the secure network to the internal management system.

16. The system of claim 10, wherein the internal management system is configured to perform any of data aggregation, correlation, alerting, dashboard, compliance, and retention of data.

17. The system of claim 10, wherein the internal management system is a first internal management system of a plurality of internal management systems, and the instructions, when executed, further cause the processor to:
cause transmission of the filtered, buffered, received log data accordingly to each of the plurality of internal management systems in an associated format.

18. The system of claim 17, wherein a record of the filtered, buffered, received log data is sent to at least two of the plurality of internal management systems.

* * * * *